(12) United States Patent
Volkerink et al.

(10) Patent No.: US 12,236,303 B2
(45) Date of Patent: *Feb. 25, 2025

(54) CORRELATED ASSET IDENTIFIER ASSOCIATION

(71) Applicant: Trackonomy Systems, Inc., San Jose, CA (US)

(72) Inventors: Hendrik J Volkerink, Palo Alto, CA (US); Ajay Khoche, West San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/679,992

(22) Filed: Feb. 24, 2022

(65) Prior Publication Data

US 2022/0292323 A1    Sep. 15, 2022

Related U.S. Application Data

(63) Continuation of application No. 16/839,048, filed on Apr. 2, 2020, now Pat. No. 11,295,190, which is a
(Continued)

(51) Int. Cl.
*G06K 19/077* (2006.01)
*B32B 37/06* (2006.01)
(Continued)

(52) U.S. Cl.
CPC ........ *G06K 19/07773* (2013.01); *B32B 37/06* (2013.01); *B32B 37/12* (2013.01); *C09J 7/38* (2018.01); *G06K 19/06037* (2013.01); *G06K 19/0702* (2013.01); *H04W 4/029* (2018.02); *B32B 2457/00* (2013.01);
(Continued)

(58) Field of Classification Search
CPC ........ G06K 19/07773; G06K 19/0702; G06K 19/06037; B32B 37/12; B32B 37/06; B32B 2457/00; C09J 7/38; C09J 2301/40; C09J 2301/124; C09J 2301/302; C09J 2463/00; C09J 2203/326; H04W 4/029;
(Continued)

(56) References Cited

U.S. PATENT DOCUMENTS 5,495,250 A    2/1996    Ghaem et al.
6,375,780 B1   4/2002    Tuttle et al.
(Continued)

FOREIGN PATENT DOCUMENTS

AU    2018204317 A1    1/2019
CA    3008512 A1       12/2018
(Continued)

OTHER PUBLICATIONS

International Patent Application No. PCT/2020/061394, International Search Report and Written Opinion dated Feb. 26, 2021, 16 pages.
(Continued)

*Primary Examiner* — Seung H Lee

(57) ABSTRACT

Systems, methods, and computer-readable data storage apparatus provide automated identification techniques that seamlessly and accurately bridge the differences between different identification systems to enable more useful and advanced product and service offerings, such as realtime tracking of shipment location and status.

19 Claims, 5 Drawing Sheets

Related U.S. Application Data continuation-in-part of application No. 16/581,599, filed on Sep. 24, 2019, now Pat. No. 11,328,201, and a continuation-in-part of application No. 16/383,353, filed on Apr. 12, 2019, now Pat. No. 10,872,286, said application No. 16/581,599 is a continuation of application No. 15/842,867, filed on Dec. 14, 2017, now Pat. No. 10,445,634, said application No. 16/383,353 is a continuation of application No. 15/842,861, filed on Dec. 14, 2017, now Pat. No. 10,262,255.

(60) Provisional application No. 62/829,627, filed on Apr. 4, 2019, provisional application No. 62/435,207, filed on Dec. 16, 2016, provisional application No. 62/434,218, filed on Dec. 14, 2016.

(51) Int. Cl.

| | | |
|---|---|---|
| *B32B 37/12* | (2006.01) | |
| *C09J 7/38* | (2018.01) | |
| *G06K 19/06* | (2006.01) | |
| *G06K 19/07* | (2006.01) | |
| *H04W 4/029* | (2018.01) | |
| *H04W 4/02* | (2018.01) | |

(52) U.S. Cl.
CPC .... *C09J 2203/326* (2013.01); *C09J 2301/124* (2020.08); *C09J 2301/302* (2020.08); *C09J 2301/40* (2020.08); *C09J 2463/00* (2013.01); *H04W 4/027* (2013.01)

(58) Field of Classification Search
CPC ....... H04W 4/027; H04W 4/185; H04W 4/80; G06Q 20/4015; G06Q 20/4014; G06Q 20/40
See application file for complete search history.

(56) References Cited

U.S. PATENT DOCUMENTS

| | | |
|---|---|---|
| 6,614,392 B2 | 9/2003 | Howard |
| 6,816,075 B2 | 11/2004 | Grunes et al. |
| 7,048,194 B2 | 5/2006 | Minami et al. |
| 7,177,054 B2 | 2/2007 | Silverbrook et al. |
| 7,187,286 B2 | 3/2007 | Morris et al. |
| 7,299,990 B2 | 11/2007 | Hoshina |
| 7,360,714 B2 | 4/2008 | Sano et al. |
| 7,405,656 B2 | 7/2008 | Olsen |
| 7,511,616 B2 | 3/2009 | Lake |
| 7,540,603 B2 | 6/2009 | Otsuki |
| 7,743,984 B2 | 6/2010 | Olsen et al. |
| 7,838,844 B2 | 11/2010 | Wagner et al. |
| 7,866,555 B2 | 1/2011 | Schmid et al. |
| 8,016,194 B2 | 9/2011 | Hause et al. |
| 8,072,620 B2 | 12/2011 | Yamamoto et al. |
| 8,171,791 B2 | 5/2012 | Sy et al. |
| 8,231,749 B2 * | 7/2012 | Dent ............... G16H 10/60 156/DIG. 47 |
| 8,292,173 B2 | 10/2012 | Yturralde et al. |
| 8,317,230 B2 * | 11/2012 | Asay ............... G09F 3/0288 283/81 |
| 8,581,701 B2 | 11/2013 | Steinmetz et al. |
| 8,686,685 B2 | 4/2014 | Moshfeghi |
| 8,833,664 B2 | 9/2014 | Choi |
| 9,251,459 B2 | 2/2016 | Simske et al. |
| 9,305,283 B1 * | 4/2016 | Lauka ............... G06K 7/10237 |
| 9,643,460 B2 | 5/2017 | Peine et al. |
| 9,644,401 B2 | 5/2017 | Nguyen et al. |
| 10,095,898 B2 | 10/2018 | Iqbal et al. |
| 10,319,203 B1 | 6/2019 | Testanero et al. |
| 10,819,137 B2 | 10/2020 | Khoche et al. |
| 11,115,732 B2 | 9/2021 | Lucrecio et al. |
| 11,295,190 B2 * | 4/2022 | Volkerink ............. B32B 37/06 |
| 2004/0044493 A1 | 3/2004 | Coulthard |
| 2004/0247016 A1 | 12/2004 | Faries et al. |
| 2005/0099292 A1 | 5/2005 | Sajkowsky |
| 2005/0131397 A1 | 6/2005 | Levin |
| 2005/0205673 A1 | 9/2005 | Morris et al. |
| 2006/0065730 A1 | 3/2006 | Quan et al. |
| 2006/0213964 A1 | 9/2006 | Excoffier et al. |
| 2006/0226957 A1 | 10/2006 | Miller et al. |
| 2007/0008120 A1 | 1/2007 | Smith et al. |
| 2007/0049291 A1 | 3/2007 | Kim et al. |
| 2007/0182556 A1 | 8/2007 | Rado |
| 2007/0287473 A1 | 8/2007 | Dupray |
| 2007/0207792 A1 | 9/2007 | Loving |
| 2008/0198002 A1 | 8/2008 | Bartholf et al. |
| 2008/0198022 A1 | 8/2008 | Battles et al. |
| 2009/0174600 A1 | 7/2009 | Mazlum et al. |
| 2009/0192709 A1 | 7/2009 | Yonker et al. |
| 2010/0089803 A1 | 4/2010 | Lavi et al. |
| 2010/0093429 A1 | 4/2010 | Mattice et al. |
| 2010/0201520 A1 | 8/2010 | Stern et al. |
| 2011/0062237 A1 | 3/2011 | Chaves |
| 2011/0139871 A1 | 6/2011 | Yturralde et al. |
| 2011/0173235 A1 | 7/2011 | Aman et al. |
| 2012/0256728 A1 | 10/2012 | Bajic et al. |
| 2012/0278676 A1 | 11/2012 | Teraura |
| 2012/0286939 A1 | 11/2012 | Cote et al. |
| 2012/0326862 A1 | 12/2012 | Kwak |
| 2013/0229263 A1 | 9/2013 | Graczyk et al. |
| 2013/0250357 A1 | 9/2013 | Yu |
| 2013/0282392 A1 | 10/2013 | Wurm |
| 2014/0067313 A1 | 3/2014 | Breed |
| 2014/0159869 A1 | 6/2014 | Zumsteg et al. |
| 2014/0240088 A1 | 8/2014 | Robinette et al. |
| 2014/0263634 A1 | 9/2014 | Iqbal et al. |
| 2015/0097674 A1 | 4/2015 | Mondal et al. |
| 2015/0156253 A1 | 6/2015 | Skaaksrud et al. |
| 2015/0349667 A1 | 12/2015 | Andosca et al. |
| 2015/0349917 A1 | 12/2015 | Skaaksrud |
| 2015/0379860 A1 | 12/2015 | Vardi |
| 2016/0011074 A1 | 1/2016 | Mian et al. |
| 2016/0026213 A1 | 1/2016 | Li et al. |
| 2016/0117458 A1 | 4/2016 | Hermans et al. |
| 2016/0205509 A1 | 7/2016 | Hopcraft et al. |
| 2017/0011606 A1 | 1/2017 | Ceccon et al. |
| 2017/0019754 A1 | 1/2017 | Wilkinson |
| 2017/0083857 A1 | 3/2017 | Barton et al. |
| 2017/0199268 A1 | 7/2017 | Frederick |
| 2017/0286903 A1 | 10/2017 | Elizondo |
| 2017/0337405 A1 | 11/2017 | Schutz |
| 2018/0011074 A1 | 1/2018 | Roman et al. |
| 2018/0163095 A1 | 6/2018 | Khoche |
| 2019/0087702 A1 | 3/2019 | Cotoc |
| 2019/0337342 A1 | 11/2019 | Genheimer et al. |
| 2019/0340483 A1 | 11/2019 | Khoche |
| 2019/0362215 A1 | 11/2019 | Khoche |
| 2019/0370624 A1 | 12/2019 | Khoche |
| 2019/0373431 A1 | 12/2019 | Gabriele et al. |
| 2020/0234098 A1 | 7/2020 | Volkerink |
| 2020/0275369 A1 | 8/2020 | Foster et al. |
| 2021/0012173 A1 | 1/2021 | Batra |
| 2021/0027122 A1 | 1/2021 | Volkerink |
| 2021/0143902 A1 | 5/2021 | Connolly et al. |
| 2021/0150159 A1 | 5/2021 | Volkerink |
| 2021/0179352 A1 | 6/2021 | Haid |
| 2021/0224721 A1 | 7/2021 | Morgenthau |
| 2022/0277154 A1 | 9/2022 | Joao |

FOREIGN PATENT DOCUMENTS

| | | |
|---|---|---|
| JP | 2008239282 A | 10/2008 |
| JP | 2011090670 A | 5/2011 |
| JP | 2012141995 A | 7/2012 |
| WO | 2010056287 A1 | 5/2010 |
| WO | WO 2011/038018 A1 | 3/2011 |
| WO | 2012139090 A1 | 10/2012 |
| WO | 2014145130 A1 | 9/2014 |

(56) References Cited

FOREIGN PATENT DOCUMENTS

| WO | 2018004962 A1 | 1/2018 |
|---|---|---|
| WO | WO 2021/076513 A1 | 4/2021 |

OTHER PUBLICATIONS

International Patent Application No. PCT/US20/26475, International Search Report and Written Opinion, dated Jul. 23, 2020, 14 pages.
Roundy et al., Energy Harvester for Rotating Environments Using Offset Pendulum and Nonlinear Dynamics, Smart Materials and Structures, IOP Publishing LTD, Sep. 9, 2014.
Ku et al., Joint Power Waveforming and Beamforming for Wireless Power Transfer, IEEE Transactions on Signal Processing, vol. 65, No. 24, Dec. 15, 2017, pp. 6409-6422.
U.S. Appl. No. 17/067,608, Ex Parte Quayle Action dated Sep. 24, 2021, 7 pages.
Ruzzeli et al., "On the RFID wake-up impulse for multi-hop sensor networks." The 1st ACM Workshop on Convergence of RFID and Wireless Sensor Networks and their Applications (SenseID) at the 5th ACM International Conference on Embedded Networked Sensor Systems (ACM SenSys 2007), Syndey, Australia, Nov. 4-9, 2007.
Ding, et al., "RFID-based Production Data Analysis in an IoT-enabled Smart Job-shop." IEEE/CAA Journal of Automatics Sinica, vol. 5, No. 1, Jan. 1, 2018.
U.S. Appl. No. 16/839,048, Ex Parte Quayle Action dated Jul. 22, 2021, 6 pages.
U.S. Appl. No. 16/839,048, Notice of Allowance dated Oct. 8, 2021, 14 pages.
Zhai et al. ("A practical wireless charging system based on ultra-wideband retro- reflective beamforming," 2010 IEEE Antennas and Propagation Society International Symposium, 2010, pp. 1-4, doi: 10.1109/APS.2010.5561113) (Year: 2010).
International Patent Application No. PCT/US2023/016408 International Search Report and Written Opinion dated Aug. 21, 2023, 32 pages.
Non Final Office Action for U.S. Appl. No. 18/083,550, mailed Jan. 9, 2024, 9 pages.
Canadian Examination Report mailed Mar. 6, 2024, for CA 3,158,677, 6 pages.
Extended European Search Report for European Application No. 20889109.3 mailed on Nov. 21, 2023, 9 pages.
International Patent Application No. PCT/US2022/038238 International Search Report and Written Opinion dated Feb. 2, 2023, 17 pages.
International Patent Application No. PCT/US2022/043255 International Search Report and Written Opinion dated Jan. 31, 2023, 11 pages.
Non Final Office Action for U.S. Appl. No. 16/359,808, mailed Jan. 22, 2020, 7 pages.
Non Final Office Action for U.S. Appl. No. 17/027,096, mailed Jun. 24, 2021, 6 pages.
Non Final Office Action for U.S. Appl. No. 17/683,738, mailed Feb. 16, 2023, 12 pages.
Non Final Office Action for U.S. Appl. No. 17/873,072, mailed Jan. 16, 2024, 28 pages.
Non Final Office Action for U.S. Appl. No. 18/083,550, mailed May 23, 2023, 7 pages.
Non Final Office Action for U.S. Appl. No. 18/378,121, mailed Aug. 15, 2024, 6 pages.
U.S. Appl. No. 16/839,048, Notice of Allowance dated Nov. 29, 2021, 15 pages.
U.S. Appl. No. 17/067,608, Notice of Allowance dated Dec. 1, 2021, 9 pages.
U.S. Appl. No. 18/083,550, Notice of Allowance dated Jul. 15, 2024, 9 pages.
Wikipedia: "Bluetooth Low Energy—Wikipedia," Sep. 5, 2019 (Sep. 5, 2019), XP093096855, Retrieved from the Internet: URL:https://en.wikipedia.org/w/index.php?title=Bluetooth_Low_Energy&oldid=914166074 [retrieved on Oct. 31, 2023], 1 page.

* cited by examiner

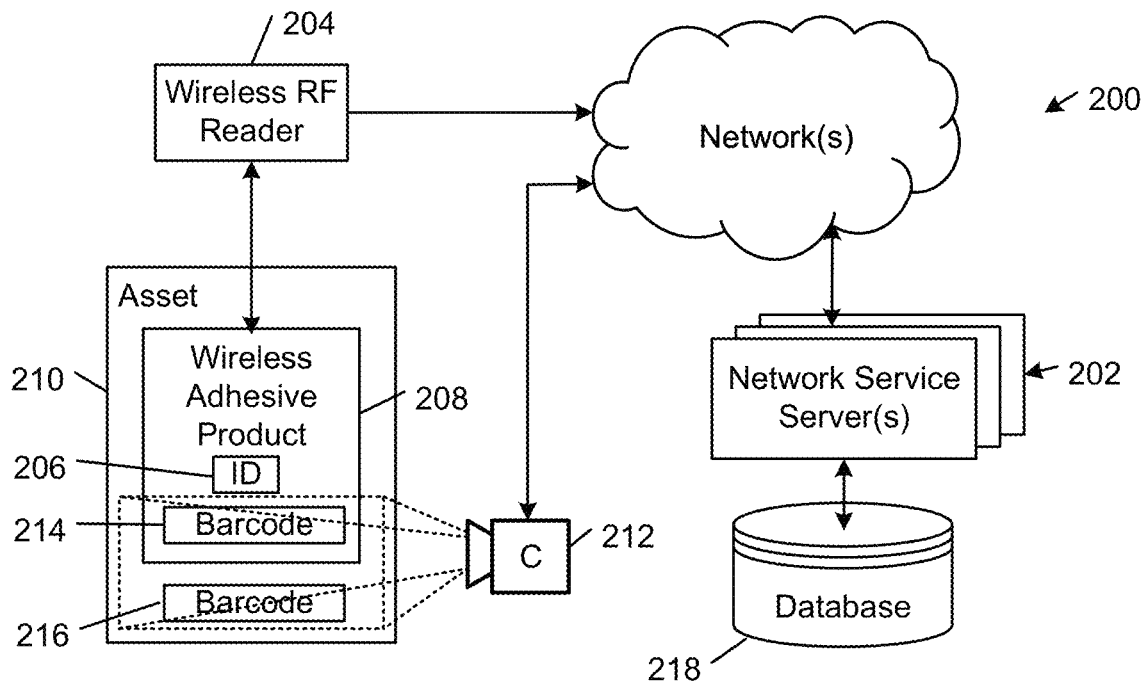

FIG. 3

| Direct A Radio Frequency Reader To Read A First Tag Attached To An Asset And Including A First Identifier, Wherein The Radio Frequency Reader Is Directed To Advertise Its Presence To The First Tag And Establish A Wireless Communications Channel With The First Tag To Retrieve The First Identifier From The First Tag | 250 |

↓

| Instruct A Second Reader To Read A Second Tag Attached To The Asset And Including A Second Identifier, Wherein First Electromagnetic Waves Are Directed Toward The Second Tag To Receive Reflected Second Electromagnetic Waves Comprising The Second Identifier | 252 |

↓

| Store An Association Between The First Identifier And The Second Identifier Predicated On The First Tag And The Second Tag Satisfying A Temporal Or Spatial Proximity Condition | 254 |

FIG. 4

CORRELATED ASSET IDENTIFIER ASSOCIATION

CROSS-REFERENCE TO RELATED APPLICATIONS

This application is a continuation of pending U.S. patent application Ser. No. 16/839,048, filed on Apr. 2, 2020, which claims priority to U.S. Provisional Patent Application No. 62/829,627, filed on Apr. 4, 2019. U.S. patent application Ser. No. 16/839,048 is a continuation-in-part of U.S. patent application Ser. No. 16/383,353, filed Apr. 12, 2019, now U.S. Pat. No. 10,872,286, which is a continuation of U.S. patent application Ser. No. 15/842,861, filed on Dec. 14, 2017, now U.S. Pat. No. 10,262,255, which claims priority to U.S. Provisional Patent Application No. 62/434,218, filed Dec. 14, 2016, and claims priority to U.S. Provisional Patent Application No. 62/435,207, filed Dec. 16, 2016. U.S. patent application Ser. No. 16/839,048 is also a continuation-in-part of U.S. patent application Ser. No. 16/581,599, filed Sep. 24, 2019, which is a continuation of U.S. patent application Ser. No. 15/842,867, filed Dec. 14, 2017, now U.S. Pat. No. 10,445,634. All of the above-referenced applications and patents are incorporated herein in their entirety.

BACKGROUND

A supplier and a company may manage different aspects of a task, such as shipping goods to the company's customers. The company may have its own information technology process for identifying assets (or items) being shipped that is different from the supplier's parcel's tracking identification system. In addition, the company and the supplier may use different asset identification technologies, such as radio frequency identification (RFID) technologies and barcode technologies. Identification techniques that bridge the differences between the company's and the supplier's identification systems to enable more useful and advanced product and service offerings are needed.

SUMMARY

In one aspect, the invention features a reader system that correlates identifiers based on their temporal or spatial proximity to one another. In examples, the reader system includes a radio frequency reader configured to read a first tag attached to an asset and including a first identifier, where the radio frequency reader is configured to advertise its presence to the first tag and establish a wireless communications channel with the first tag to retrieve the first identifier from the first tag. The reader system includes a second reader configured to read a second tag attached to the asset and including a second identifier, where the second reader is configured to direct first electromagnetic waves at the second tag to receive second electromagnetic waves including the second identifier. The reader system also includes an association module configured to store an association between the first identifier and the second identifier predicated on the first tag and the second tag satisfying a temporal or spatial proximity condition.

The invention also features apparatus operable to implement the method described above and computer-readable media storing computer-readable instructions causing a computer to implement the method described above.

DESCRIPTION OF DRAWINGS

FIG. 3 is a schematic diagram of a network for implementing an example system for reading and correlating asset identifiers.

FIG. 4 is a flow diagram of an example process for correlating asset identifiers.

DETAILED DESCRIPTION

Figure 1:
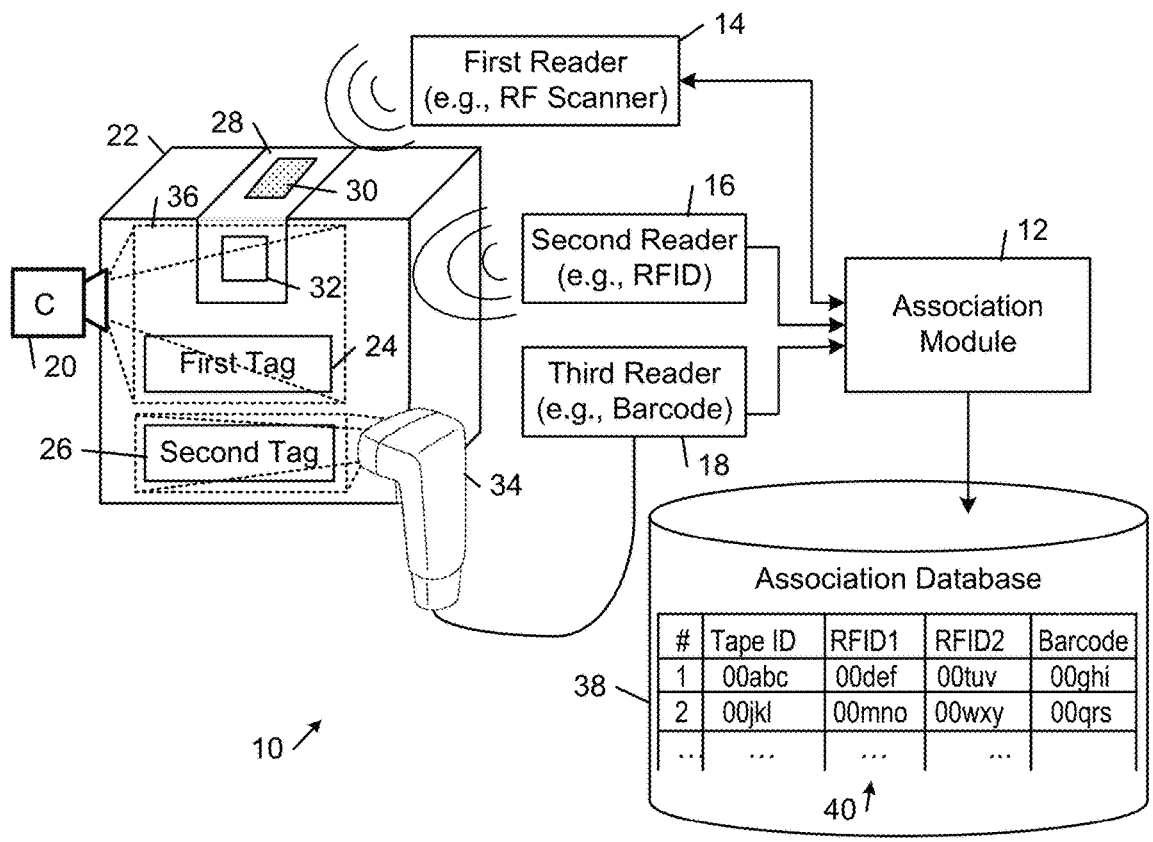
FIG. 1 is a block diagram of an example system for reading and correlating asset identifiers.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

INTRODUCTION

The present invention is not limited in any way to the illustrated embodiments. Instead, the illustrated embodiments described below are merely examples of the invention. Therefore, the structural and functional details disclosed herein are not to be construed as limiting the claims. The disclosure merely provides bases for the claims and representative examples that enable one skilled in the art to make and use the claimed inventions. Furthermore, the terms and phrases used herein are intended to provide a comprehensible description of the invention without being limiting.

Example embodiments described herein generally relate to identification systems and methods for automatically associating two or more identifiers that bridge different identification systems and, in some examples, relate to systems, methods, and computer program instructions for automatically associating identifiers for shipping, tracking, logistics, and other purposes.

In the following description, like reference numbers are used to identify like elements. Furthermore, the drawings are intended to illustrate major features of exemplary embodiments in a diagrammatic manner. The drawings are not intended to limit the disclosed aspects nor depict every feature of actual embodiments nor relative dimensions of the depicted elements, and are not drawn to scale.

As used herein, the term "or" refers an inclusive "or" rather than an exclusive "or." In addition, the articles "a" and "an" as used in the specification and claims mean "one or more" unless specified otherwise or clear from the context to refer the singular form.

The term "data object" refers to an addressable data file or a subset thereof.

The term "metadata" include information about data objects or characteristics thereof.

The terms "module," "manager," and "unit" refer to hardware, software, or firmware, or a combination thereof.

Exemplary Embodiments

In an example scenario, a supply chain involves a company and its suppliers and customers. The suppliers provide goods or services, or both, to the company. In some cases, the suppliers and the company manage different aspects of a task, such as shipping goods to the company's customers. In example embodiments described herein, the company has its own information technology process for identifying assets (or items) being shipped. For example, the company may use a particular parcel tracking identification system that is different from the supplier's parcel's tracking identification system. In addition, the company and the supplier may use different asset identification technologies, including radio frequency identification (RFID) technologies and barcode technologies. What are needed are automated identification techniques that seamlessly and accurately bridge the differences between the company's and the supplier's identification systems to enable more useful and advanced product and service offerings such as realtime tracking of shipment location and status.

FIG. 1 shows a block diagram of an example system 10 for reading and correlating identifiers relating to an asset. The system 10 includes an association module 12. The association module 12 is communicably connected to each of a first reader 14, a second reader 16, a third reader 18, and a camera 20. An asset 22 may be any type of good or other item. In the illustrated example, the asset 22 is depicted as a box containing one or more goods or other assets. In general, the asset 22 may be any type of item.

The asset 22 is associated with tags, including a first asset tag 24, a second asset tag 26, and a wireless adhesive product 28 that includes a first adhesive product tag 30 and a second adhesive product tag 32. In an embodiment, the first and second asset tags 24, 26 typically are associated with the company and the wireless adhesive product tags 30, 32 typically are associated with the supplier. In some examples, each of the first asset tag 24 and the second asset tag 26 may include either a RFID tag that is associated with a respective a globally unique identification number or a barcode that is associated with a respective a globally unique identification number. The barcode may include any type of one-dimensional barcode (also referred to as a linear barcode) or any type of two-dimensional barcode (also referred to as a matrix barcode). In an illustrative non-limiting example of the embodiment shown in FIG. 1, the first asset tag 24 is a RFID tag, the second asset tag 26 is a barcode, the first wireless adhesive product tag 30 may be any type of RF wireless communications tag, and the second wireless adhesive product tag 32 may be any type of RFID tag.

The first reader 14 may be, for example, a wireless RF scanner device that is configured to communicate with the first adhesive product tag 30 of the wireless adhesive product 28. Example wireless RF scanner devices include a Bluetooth scanner (e.g., a Bluetooth Low Energy scanner), a near field communication (NFC) scanner, a LoRaWAN scanner, and a cellular scanner. In an illustrative embodiment, a Bluetooth Low Energy (BLE) scanner is configured to locate and communicate with BLE adhesive product tags within the scanner's range. In this process, the BLE scanner advertises its presence with a specific authentication identifier and credentials. When a BLE adhesive product tag receives data from the BLE scanner, the BLE adhesive product tag establishes a handshake with the BLE scanner on the corresponding advertisement channel. Then the BLE adhesive product tag hands off communication with the BLE scanner to a data channel (e.g., a BLE data channel). The BLE adhesive product tag learns the BLE scanner's product identification number (PIN) and type identification number (TIN) and transmits that information to a network service to let the network service know that the BLE scanner is communicating with the BLE adhesive product tag. Scanners and peripheral adhesive product tags for LoRaWAN, cellular, ZigBee, and other wireless communications operate in accordance with analogous communications protocols.

The second reader 16 may be, for example, a RFID reader that is configured to interrogate the second wireless adhesive product tag 32, which is a RFID tag. The RFID tag 32 may be configured with a fixed packet of read-only data that can be transmitted to a RFID reader (e.g., RFID reader 16) within range of the RFID tag 32. The RFID tag 32 typically can be reprogrammed with different data, as needed. When the RFID reader 16 is moved within range of a corresponding RFID tag 32 and operates within the same frequency range of the RFID reader 16, the RFID reader 16 may read the RFID tag 32. In some examples, the typical range of the RFID reader 16 may be 10 centimeters to 100 centimeters from the RFID tag 32. However, in certain applications, the range of the RFID reader 16 is approximately 5 centimeters to 20 centimeters from the RFID tag 32. In operation, data is transmitted on modulated radio frequency electromagnetic waves between the RFID reader 16 and the RFID tag 32. In this process, the RFID reader 16 transmits an electric or magnetic field that is sensed by the RFID tag 32. In response, the RFID tag 32 transmits data (including a globally unique identification number) that typically is stored in a microchip associated with the RFID tag 32.

In general, the RFID tag 32 may be an active RFID tag or a passive RFID tag. Active RFID tags include local power sources (e.g., batteries) for sending data packets to a RFID reader. Passive RFID tags, on the other hand, do not require any local power sources to transmit data packets to a RFID reader; instead, passive RFID tags are powered by inductive or capacitive coupling between the RFID reader and the RFID tag. In an example, a passive RFID tag is configured to couple to the magnetic fields generated by a RFID reader. In this regard, each of the RFID reader and the RFID tag includes a respective set of one or more electrically conducting coils. The RFID reader uses its power source to generate an electric current in the set of coils to generate magnetic fields that induce a current in the set of coils in the RFID tag. The induced current powers the RFID tag to generate a wireless RFID signal that is transmitted to the RFID reader. In another example, a passive RFID tag is configured to capacitively couple with a corresponding RFID reader through capacitive coupling plates. In this process, the RFID reader generates an alternating electric field that causes the RFID tag to transfer data to the RFID reader. However, capacitively coupled RFID readers and tags can only transfer information across short distances and therefore are typically limited to near-field applications.

The third reader 18 may be, for example, a barcode reader that is configured to read the second tag 26 that includes a barcode. In some embodiments, the barcode reader 18 includes a terminal device 34 and a decoder processing unit. The terminal device 34 may include a light source, a lens, and a light sensor that converts optical impulses reflected from the barcode into electrical signals that are input into a decoder circuit in the decoder processing unit. The decoder circuit processes the barcode image data captured by the light sensor to generate electrical output data, which may include, for example, a globally unique identification number associated with the barcode. In some examples, the decoder processing unit is incorporated into the local terminal device 34. In other embodiments, the decoder processing unit is incorporated into a separate processing system (e.g., a network server system).

The camera 20 (labeled with the letter "C") may be, for example, a still image camera and/or a video camera. In some embodiments, the camera 20 is configured to capture images of at least a portion of the asset 22. In some examples, the camera 20 is configured to capture an image of a view of each asset moving on an automated conveyor system. In other examples, the camera 20 is configured to automatically detect the locations of tags on the asset 22 and to automatically capture images of one or more views of the tags. In the illustrated example shown in FIG. 1, the camera 20 is configured to capture an image of the second adhesive product tag 32 and the first asset tag 24 on one side of the asset 22 within the camera view 36. Other examples may include multiple cameras to capture one or more images of one or more views of the asset 22.

In some examples, two or more of the first reader 14, the second reader 16, the third reader 18, and the camera 20 may be integrated into a single component. For example, the first reader 14 and the second reader 16 may be integrated into a RF scanning component configured to communicate with and read data from the wireless adhesive product 28 and the RFID tag 24 (I.e., the "First Tag"), and the third barcode reader 18 (including the terminal device 34) and the camera 20 may be incorporated into an imaging component of the system 10. In another example, camera 20 may be configured to capture images of the barcodes and send the captured barcode images to an image processing module (e.g., the association module 12 or an intermediate decoder module) that is configured to analyze and process the captured barcode images to generate output data including, for example, the globally unique identification numbers encoded within the barcodes. In some of these examples, the camera 20 would perform the imaging functions of the third reader 18 (including the terminal device 34), and the association module 12 would perform the analyzing and decoder processing functions to generate the output data.

As explained above, in some cases, coordination of activities performed by a supplier and a company can be hampered when the supplier and company utilize different systems of identification. The wireless adhesive product 28 can perform a variety of functions including, for example, adhesive tape functions (e.g., sealing assets) or adhesive label functions (e.g., labeling assets), sensing functions (e.g., monitoring or sensing the status or state of a shipment), and wireless communications functions (e.g., tracking locations of assets and reporting asset status and condition). In the illustrated example, the supplier provides the company with the wireless adhesive product 28, as well as tracking and reporting services. The wireless adhesive product 28 can be divided into segments, where each segment of the wireless adhesive product includes at least one respective globally unique identifier stored in an memory device embedded in the wireless adhesive product.

In the illustrated embodiments, the company and the supplier use different systems of identifying assets that are packaged and shipped. In some examples, the company utilizes RFID or barcode tags to identify the company's assets, whereas the supplier utilizes a wireless adhesive product in the form of a tape or a label that includes a globally unique identifier stored in a memory embedded in the tape or label, along with other components including wireless communications components, data processing components, locationing components, and sensing components.

In these embodiments, the association module 12 receives output data generated by two or more of the first reader 14, the second reader 16, the third reader 18, and the camera 20. The association module 12 associates the tag data received from two or more of the tags predicated on the tags satisfying a temporal or spatial proximity condition with respect to the asset 22. Examples of temporal and spatial proximity conditions include: (1) a determination that one tag and another tag are both physically associated with the same asset; (2) a determination that one tag and another tag both appear in a single image of the asset; (3) a determination that one tag and another tag are read contemporaneously; and (4) a determination that a tag from one source (e.g., the supplier) and a tag from a different source (e.g., the company) are read consecutively where, in some embodiments, the association module 12 generates an error message in response to a determination that that two consecutive tag reads are from the same source (i.e., at least two tags sourced from the supplier are read consecutively, or at least two tags sourced from the company are read consecutively).

In an example, the determination that one tag and another tag are both physically associated with an asset can be made using short-range scanners that have limited ranges for scanning tags on the asset 22 (e.g., 5 centimeters to 20 centimeters, depending on the size of the asset 22). The detection of multiple tags using this approach makes it highly likely that the tags are associated with the same asset 22. Exemplary short-range scanners include short-range RFID scanners and near field communications (NFC) scanners, which have ranges on the order of 5 centimeters to 20 centimeters, for example. In a second example, a determination that one tag and another tag are both physically associated with the asset 22 can be made by applying image processing techniques (e.g., barcode decoding techniques) to detect features in an image of the asset 22 that correspond to the two tags. In a third example, a determination that one tag and another tag are read contemporaneously can be made when consecutive timestamp data corresponding to the read times of the tags satisfy a temporal proximity condition (e.g., the difference between the read times of the tags is within a specified period of time). In a fourth example, a determination that a tag from one source (e.g., the supplier) and a tag from a different source (e.g., the company) are read consecutively can be made by analyzing a sequence of the timestamp data from a one of the tags to another one of the tags, and determining whether or not an intervening tag was read at a time between the read times of the one tag and the other tag.

These determinations can be made recursively so that multiple identifier associations may be chained together. For example, in some embodiments, the association module 12 is configured with programmatic methods and heuristics for associating an identifier stored in a memory component of the supplier's wireless adhesive product 28 with an identifier generated by the company's identification system. Some of these methods involve "bridging the gap" between the wireless adhesive product identifier of the supplier and the asset identifier of the company through the use of one or more intermediate identifiers.

In the example approach shown in FIG. 1, instead of associating the identifier of the wireless adhesive product 28 directly with the identifier in the company's RFID tag 24 on the asset 22, the wireless adhesive product 28 includes an RFID tag 32 that can be read contemporaneously with other RFID tags within range of the RFID scanner that are being scanned (e.g., the RFID identifier stored in the first tag 24). In this example, the identifier of the wireless adhesive product 28 and the identifier of the RFID tag 32 are embedded in the same segment of the supplier's wireless adhesive product 28. The supplier typically stores the association between the identifier of the wireless adhesive product 28 and the identifier of the RFID tag 32 in its own association database 38, which may be stored by the supplier in cloud storage or in the memory of the wireless adhesive product 28 (e.g., the tape or label).

The association module 12 can associate the identifier of the RFID tag 32 with the identifier of RFID tag 24 predicated on the RFID tags 24, 32 satisfying a temporal or a spatial proximity condition with respect to the asset 22. In an example, a determination that the RFID tags 24 and 32 are both physically associated with the asset 22 can be made by applying image processing techniques to detect features in a single image of the asset 22 that correspond to the two RFID tags 24, 32. In another example, a determination that the RFID tags 24 and 32 are read contemporaneously can be made when consecutive timestamp data corresponding to the read times of the RFID tags 24 and 32 satisfy a temporal proximity condition (e.g., the difference in the read times of the tags are within a specified period of time).

In the example described above, the third reader 18 may be a barcode reader that is configured to read the second tag 26, which includes a barcode. In one example, the association module 12 can associate the barcode identifier of the second tag 26 with the RFID identifier of the first tag 24 based on an image of the asset 22 that is captured by the camera 20 and includes the first and second tags 24, 26 within the captured image.

In some examples, the association module 12 stores the determined chain of associations between the different identifiers in a table 40 of a database 38. The table 40 may be used by an asset management system to track assets, monitor the status or state of a particular asset, and report the status and condition of an asset. Referring to FIG. 1, the association database 38 includes a table 40 of identifiers organized in a set of rows. Each row of identifiers is associated with a respective asset. For example, row 1 corresponds to the identifiers that are associated with asset 1, and row 2 corresponds to the identifiers that are associated with asset 2, and so on. Each row of associated identifiers enables the supplier, for example, to generate a report of the location, status, and condition of the associated asset as the asset travels through a logistics network by associating, for example, a scanned bar code identifier or a transmitted RFID data packet with the corresponding wireless adhesive product identifier.

Figure 2:
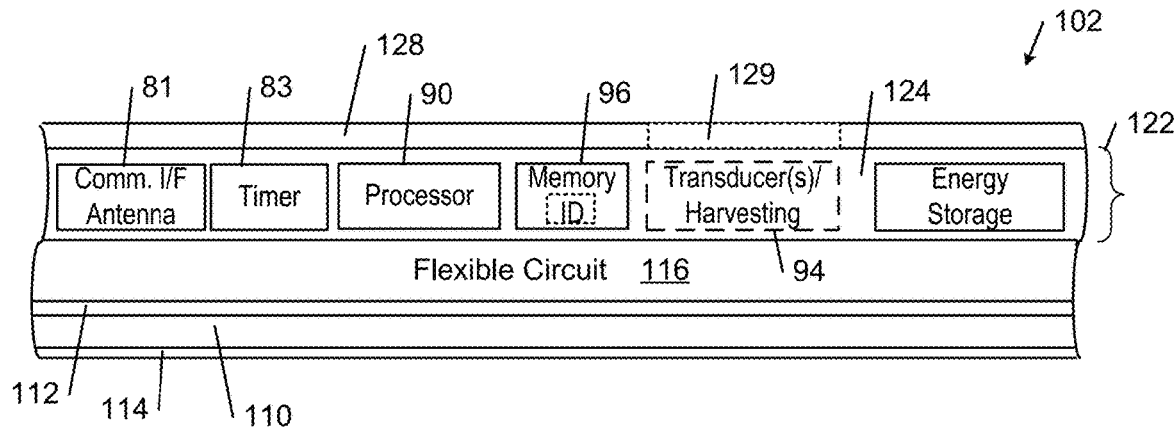
FIG. 2 is a diagrammatic cross-sectional side view of an example wireless communications adhesive product storing an identifier.

FIG. 2 shows a cross-sectional side view of a portion of an example segment 102 of the wireless adhesive product 28 that includes a respective set of the components of a wireless transducing circuit. The flexible adhesive tape platform segment 102 includes an adhesive layer 112, an optional flexible substrate 110, and an optional adhesive layer 114 on the bottom surface of the flexible substrate 110. If the bottom adhesive layer 114 is present, a release liner (not shown) may be weakly adhered to the bottom surface of the adhesive layer 114. In some examples, the adhesive layer 114 includes an adhesive (e.g., an acrylic foam adhesive) that has a high bond strength that is sufficient to prevent removal of the adhesive segment 102 from a surface on which the adhesive layer 114 is adhered without destroying the physical or mechanical integrity of the adhesive segment 102 and/or one or more of its constituent components. In some examples, the optional flexible substrate 110 is implemented as a prefabricated adhesive tape that includes the adhesive layers 112, 114 and the optional release liner. In other examples, the adhesive layers 112, 114 are applied to the top and bottom surfaces of the flexible substrate 110 during the fabrication of the adhesive tape platform 100. The adhesive layer 112 bonds the flexible substrate 110 to a bottom surface of a flexible circuit 116, that includes one or more wiring layers (not shown) that connect the processor 90, one or more antennas connected to a wireless communications interface 81 (e.g., a low power interface, such as Zigbee or Bluetooth® Low Energy (BLE) interfaces, or other communications interfaces, such as LoRaWAN and cellular interfaces), a timer circuit 83, transducing and/or energy harvesting component(s) 94 (if present), a memory 96 that stores an identifier (ID) of the wireless adhesive product 28, an energy storage component 92, and other components in a device layer 122 that are interconnected through the flexible circuit 116. These components enable the transducing, tracking and other functionalities of the flexible adhesive tape platform segment 102. The wireless communications interface 81 typically includes one or more of the antennas 84, 88 and one or more of the wireless circuits 82, 86.

FIG. 3 shows an embodiment of a network 200 that administers wired and wireless network communications between an asset management service 202 and a wireless RF reader 204 and an imaging device 206. The network 200 may include one or more of the internet, a private network, a cellular network, a LoRaWAN network, a Bluetooth Low Energy network, and any other suitable communications networks.

In the illustrated embodiment, the wireless RF reader 204 is configured to read data from one or more types of wireless devices. In an example, the wireless RF reader 204 is configured to retrieve an identifier (ID) 206 of the wireless adhesive product 208 on an asset 210. In this regard, the wireless RF reader 204 executes the process by stepping through the appropriate communications protocol to read the ID 206 stored in the wireless adhesive product. The wireless RF reader 204 typically includes one or more processors, memory, one or more communications interfaces, and one or more antennas that collectively operate to implement the reading process.

The imaging device 212 may be any suitable type of still image camera or video camera that is configured to capture an image of the asset 210 that includes one or both of the barcodes 214, 216. In some embodiments, the imaging device 212 is capable of decoding the barcodes 214, 216 that are captured in the one or more images. In other embodiments, the imaging device 212 is configured to transmit the captured images of the barcodes 214, 216 to the network service 202 for processing. In this embodiment, the network service 202 is configured to analyze and decode the barcodes appearing in the images 214, 216.

In some embodiments, the asset management service 202 controls the operations of the wireless RF reader 204 and the imaging device 212. The asset management service 202 also typically manages the process of associating identifiers with one another. In the illustrative example shown in FIG. 3, the asset management service 202 is the same entity as the supplier of the wireless adhesive product 208 described above. Therefore, since the supplier/asset management service 202 manufactured the wireless adhesive product 208, the asset management service 202 readily can associate the identifiers of the wireless adhesive product 208 and the barcode 214. The asset management service 202 is configured to store an association between the identifier 206 of the wireless adhesive product 208 and the barcode 214 in the database 218.

The asset management service 202 also is operable to link the wireless adhesive product identifier 206 with the company's bar code 216 on the asset 210. Such a link would associate the wireless adhesive product identifier 206 with the identifier that is used by the company for the asset and thereby enable the supplier to use the company's identifier associated with the barcode 216 to report information regarding tracking shipment location, status, and other related information. In the illustrated example, a determination that the supplier's barcode tag 214 and the company's barcode tag 216 are both physically associated with the asset 22 can be made by applying image processing techniques (e.g., barcode decoding techniques) to detect features that correspond to the two barcode tags 214, 216 in a single image of the asset 210. In another example, a determination that a tag from one source (e.g., the supplier) and a tag from a different source (e.g., the company) are read consecutively can be made by analyzing a sequence of the timestamp data from one of the tags to the other and determining whether or not an intervening tag was read at a time between the read times of the two tags.

FIG. 4 shows a flow diagram of an example process of associating identifiers associated with different sources. In accordance with this process, a radio frequency reader is directed to read a first tag attached to an asset and including a first identifier (FIG. 4, block 250). In this process, the radio frequency reader is directed to advertise its presence to the first tag and establish a wireless communications channel with the first tag to retrieve the first identifier from the first tag. A second reader is instructed to read a second tag attached to the asset and including a second identifier (FIG. 4, block 252). In this process first electromagnetic waves are directed toward the second tag to receive reflected second electromagnetic waves comprising the second identifier. An association between the first identifier and the second identifier is stored predicated on the first tag and the second tag satisfying a temporal or spatial proximity condition (FIG. 4, block 254).

Figure 5A:
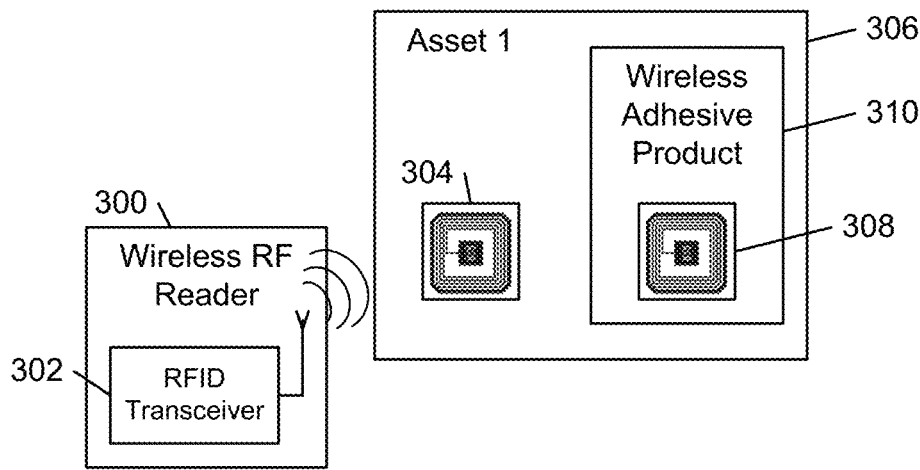
FIGS. 5A-5C are diagrammatic views of example techniques for reading and correlating asset identifiers.
Figure 5B:
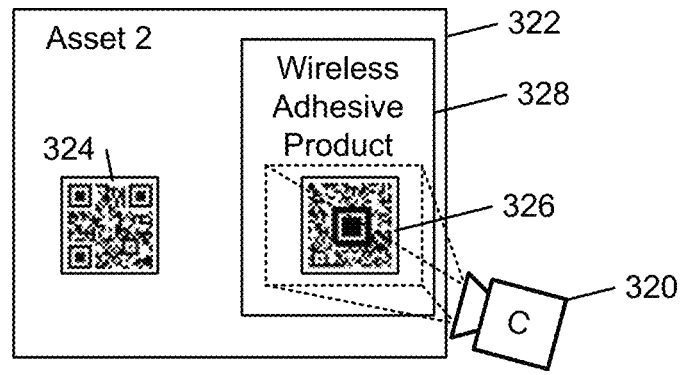
Figure 5C:
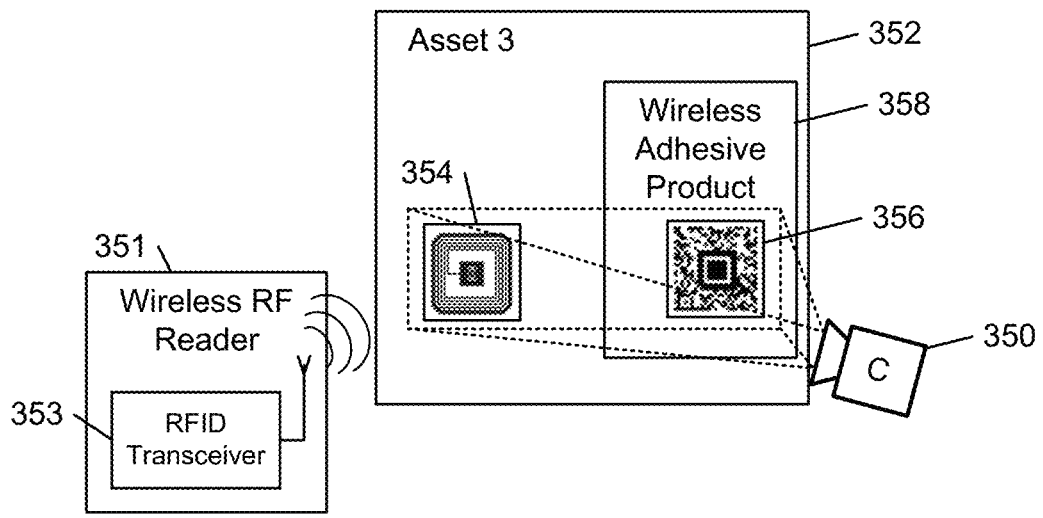

FIGS. 5A-5C show various exemplary systems and methods of reading and correlating identifiers on assets.

FIG. 5A shows an example wireless RF reader 300 that includes a RFID transceiver 302 configured to read data from a first RFID tag 304 adhered to an asset 306 and a second RFID tag 308 embedded in a wireless adhesive product 310 adhered to the same asset 306. Each of the RFID tags 304, 308 may be configured with a respective fixed packet of read-only data (including, e.g., a respective tag identifier) that can be wirelessly transmitted to the RFID transceiver 302 of the wireless RF reader 300. When the wireless RF reader 300 is moved within range of one or both of the RFID tags 304, 308 and communicates in the same radio-frequency range as the RFID tags 304, 308, the wireless RF reader 300 may read the respective identifier and other data from the RFID tags 304, 308 contemporaneously or consecutively.

In some examples, the wireless RF reader transmits the data its reads from the RFID tags 304, 308 to the network service 202 (see FIG. 3). Alternatively, the wireless RF reader 300 transmits the data to the wireless adhesive product 310, which stores the data read by the wireless RF reader 300 in the memory component and transmits the stored data to the network service 202. In these examples, either the wireless RF reader 300 or the wireless adhesive product 310 transmits the data read by the wireless RF reader 300 to the network service 202.

In some examples, the network service 202 is configured to create an association between the RFID tags 304, 308 predicated on the tags satisfying a temporal or spatial proximity condition with respect to the asset 306, as explained herein. Based on a determination that the proximity condition is satisfied, the network service 202 may store the association in the association database 218 or in the memory of the wireless adhesive product adhered to the asset 306. In some examples, during manufacture of the wireless adhesive product 310, the network service 202 stores an association between the identifier of the RFID tag 308 and the identifier stored in the wireless adhesive product 310 in the association database 218 or in the memory of the wireless adhesive product 310. In some examples, the wireless RF reader 300 also is configured to wirelessly communicate with the wireless adhesive product 310 and read the identifier stored in the memory component of the wireless adhesive product 310.

FIG. 5B shows an example of an imaging device 320 that is configured to capture images of visible features on an asset 322. The asset 322 includes a first barcode 324 adhered to the asset 322 and a second barcode 326 that is incorporated on the wireless adhesive product 326. Each of the barcodes 324, 326 includes markings that encode respective identifiers and potentially other information. The imaging device 320 is configured to capture a respective image of each barcode 324, 326. In some examples, the imaging device 320 also includes processing circuitry and processor executable instructions to read the respective barcodes 324, 326. In other examples, the imaging device 320 is operable to transmit the captured barcode images to the network service 202 to be decoded. In other examples, the imaging device 320 is operable to communicate with the wireless adhesive product 328, store the captured barcode images in the memory component of the wireless adhesive product, and transmit the captured barcode images or the decoded data to the network service 202. In these examples, either the imaging device 320 or the wireless adhesive product 328 transmits the image data or the decoded image data to the network service 202.

In some examples, the network service 202 is configured to create an association between the barcodes 324, 326 predicated on the tags satisfying a temporal or spatial proximity condition with respect to the asset 322, as explained herein. Based on a determination that the proximity condition is satisfied, the network service 202 may store the association in the association database 218 or in the memory of the wireless adhesive product 328 adhered to the asset 322. In some examples, during manufacture of the wireless adhesive product 328, the network service 202 stores an association between the identifier of the barcode 326 and the identifier stored in the memory component of the wireless adhesive product 328 in the association database 218 or in the memory component of the wireless adhesive product 328. In some examples, the camera 320 also is configured to wirelessly communicate with the wireless adhesive product 328 and read the identifier stored in the memory component of the wireless adhesive product 328.

FIG. 5C shows an example of an imaging device 350 that is configured to capture images of visible features on an asset 352. In some examples, the imaging device 350 has a 180 degree field of view. The asset 352 includes a RFID tag 354 adhered to the asset 352 and a barcode 356 that is incorporated on the wireless adhesive product 358. Each of the RFID tag 354 and the barcode 356 stores respective identifiers and potentially other information.

The wireless RF reader 351 includes a RFID transceiver 353 that is configured to read data from the RFID tag 354 adhered to the asset 352. The RFID tag 354 may be configured with a respective fixed packet of read-only data (e.g., a respective tag identifier) that can be wirelessly transmitted to the RFID transceiver 353 of the wireless RF reader 351. When the wireless RF reader 351 is moved within range of the RFID tag 354 and communicates in the same radio-frequency range as the RFID tag 354, the wireless RF reader 351 may read the respective identifier and other data from the RFID tag 354 contemporaneously or consecutively The imaging device 350 is configured to capture a respective image of the barcode 356. In some examples, the imaging device 350 also includes processing circuitry and executable instructions to read the barcode 356. In some of these examples, the imaging device 350 is operable to transmit the captured barcode image to the network service 202 to be decoded. In still other examples, the imaging device 350 is operable to communicate wirelessly with the wireless adhesive product 358, store the captured barcode image in the memory component of the wireless adhesive product 358, and transmit the captured barcode image or the decoded barcode data to the network service 202. In these examples, either the imaging device 350 or the wireless adhesive product 358 may transmit the image data or the decoded image data to the network service 202.

In some examples, the network service 202 is configured to create an association between the RFID tag 354 and the barcode 356 predicated on the tags satisfying a temporal or spatial proximity condition with respect to the asset 322, as explained herein. In an example, the spatial proximity condition is satisfied in response to a determination that the imaging device 350 captured the RFID tag 354 and the barcode 356 on the asset 352 in a single image. Based on a determination that the proximity condition is satisfied, the network service 202 may store the association between the RFID tag 354 and the barcode 356 in the association database 218 or in the memory of the wireless adhesive product 358 adhered to the asset 352. In some examples, during manufacture of the wireless adhesive product 358, the network service 202 stores an association between the identifier of the barcode 356 and the identifier of the RFID tag 354 in the association database 218 or in the memory of the wireless adhesive product 328. In some examples, the imaging device 350 also is configured to wirelessly communicate with the wireless adhesive product 328 and read the identifiers stored in the memory component of the wireless adhesive product 358.

Figure 6:
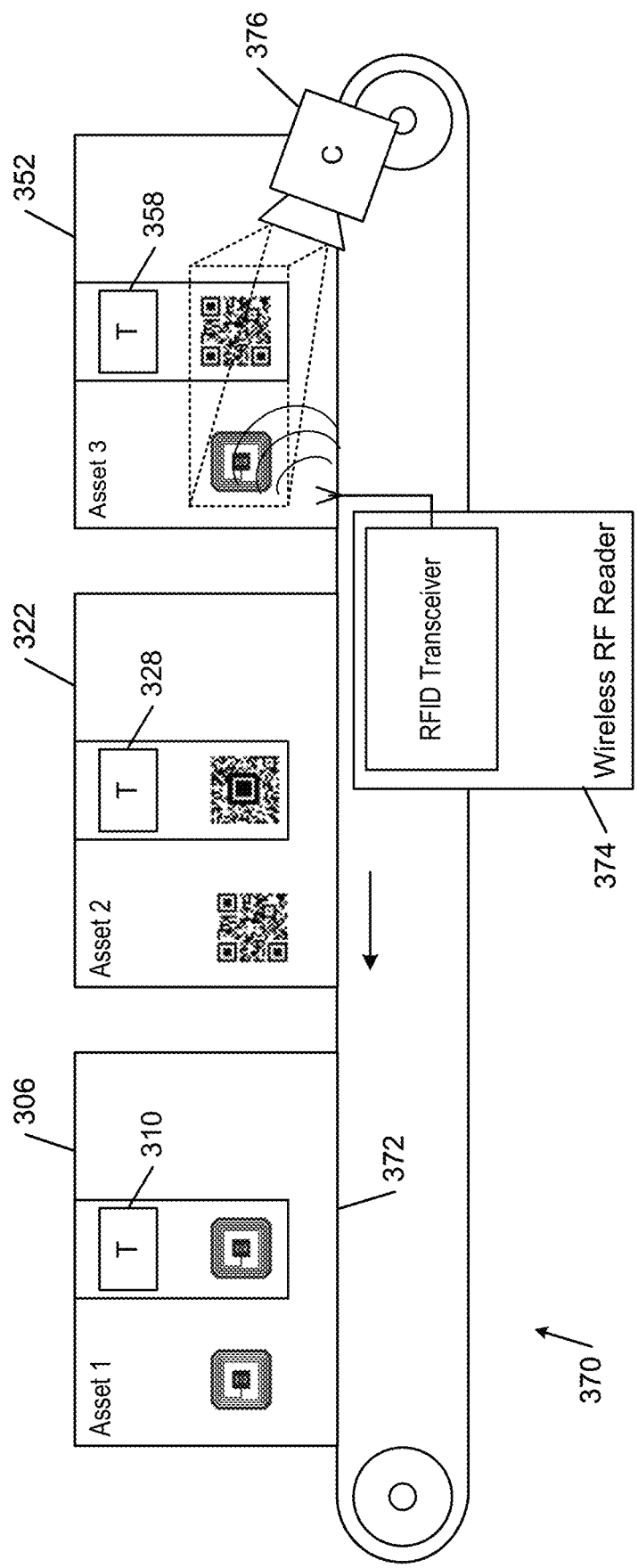
FIG. 6 is a diagrammatic side view of an asset conveyor system that includes different components for reading asset identifiers.

FIG. 6 shows a conveyor system 370 configured to convey assets through a scanning zone 372 configured with a wireless RF reader 374 and an imaging device 376 to implement an automated process for reading and associating asset identifiers. In some examples, the wireless RF reader 374 and the imaging device 376 are configured to perform one or more of the reader operations and identifier association operations that are described above. The illustrated embodiment shows the asset 306 ("Asset 1"), the asset 322 ("Asset 2"), and the asset 352 ("Asset 13") being conveyed on, for example, a conveyor belt or on rollers, past the wireless RF reader 374 and the imaging device 376 in a first-in, first out (FIFO) order. In some examples, the wireless RF reader 374 and the imaging device 376 may be configured in accordance with the embodiments described above in connection with FIGS. 5A-5C.

Exemplary Computer Apparatus

Figure 7:
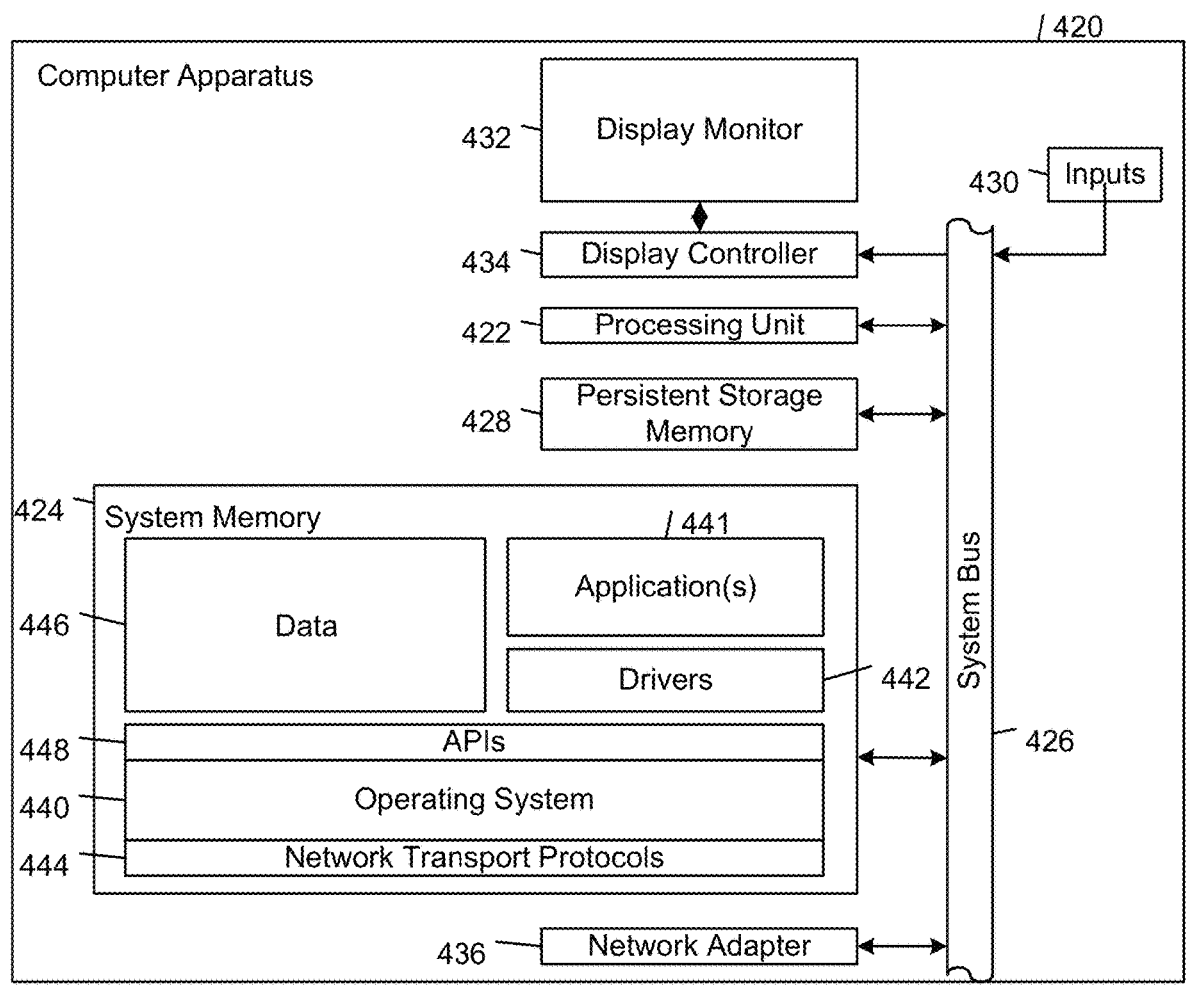
FIG. 7 is a block diagram of an example computer apparatus.

FIG. 7 shows an example embodiment of computer apparatus that is configured to implement one or more of the computing systems described in this specification. The computer apparatus 420 includes a processing unit 422, a system memory 424, and a system bus 426 that couples the processing unit 422 to the various components of the computer apparatus 420. The processing unit 422 may include one or more data processors, each of which may be in the form of any one of various commercially available computer processors. The system memory 424 includes one or more computer-readable media that typically are associated with a software application addressing space that defines the addresses that are available to software applications. The system memory 424 may include a read only memory (ROM) that stores a basic input/output system (BIOS) that contains start-up routines for the computer apparatus 420, and a random access memory (RAM). The system bus 426 may be a memory bus, a peripheral bus or a local bus, and may be compatible with any of a variety of bus protocols, including PCI, VESA, Microchannel, ISA, and EISA. The computer apparatus 420 also includes a persistent storage memory 428 (e.g., a hard drive, a floppy drive, a CD ROM drive, magnetic tape drives, flash memory devices, and digital video disks) that is connected to the system bus 426 and contains one or more computer-readable media disks that provide non-volatile or persistent storage for data, data structures and computer-executable instructions.

A user may interact (e.g., input commands or data) with the computer apparatus 420 using one or more input devices 430 (e.g. one or more keyboards, computer mice, microphones, cameras, joysticks, physical motion sensors, and touch pads). Information may be presented through a graphical user interface (GUI) that is presented to the user on a display monitor 432, which is controlled by a display controller 434. The computer apparatus 320 also may include other input/output hardware (e.g., peripheral output devices, such as speakers and a printer). The computer apparatus 420 connects to other network nodes through a network adapter 336 (also referred to as a "network interface card" or NIC).

A number of program modules may be stored in the system memory 424, including application programming interfaces 438 (APIs), an operating system (OS) 440 (e.g., the Windows® operating system available from Microsoft Corporation of Redmond, Washington U.S.A.), software applications 441 including one or more software applications programming the computer apparatus 420 to perform one or more of the steps, tasks, operations, or processes of the hierarchical classification systems described herein, drivers 442 (e.g., a GUI driver), network transport protocols 444, and data 446 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

The invention claimed is:

1. A system for correlating identifiers of tags, comprising:
an association module comprising computer readable instructions that when executed by a processor operate to:
receive from a first reader a first identifier of a first tag associated with a first entity;
receive from the first reader a first time associated with the first identifier;
receive from a second reader different from the first reader a second identifier of a second tag associated with a second entity;
receive from the second reader a second time associated with the second identifier;
determine that the first tag is in temporal proximity to the second tag based on the received first time and the received second time;
in response to determining that the first tag is in temporal proximity to the second tag, generate an association defining a correlation between the first identifier to the second identifier; and
store the association in a database.

2. The system of claim 1, the first entity being in a supply chain to supply one or both of goods and services to the second entity.

3. The system of claim 1, the first entity being a parcel delivery service for goods of the second entity.

4. The system of claim 1, the first identifier being an RFID identifier, and the second identifier being a barcode identifier.

5. The system of claim 1, wherein the instructions that operate to determine that the first tag is in temporal proximity to the second tag include instructions that, when executed by the processor, operate to:
receive an image of an asset having the first tag and the second tag attached thereto; and
determine that the first tag and the second tag are present in the image.

6. The system of claim 5, where the first reader capturing at least the first identifier, and a camera capturing at least the image are located on a conveyor belt such that the asset and other assets pass the first reader and the camera in order.

7. The system of claim 1, further comprising an asset management module comprising computer readable instructions that when executed by a processor operate to receive a post-association indication of a scan of the second tag, and to use location information associated with the post-association indication to track the first tag.

8. A method comprising:
receiving from a first reader a first identifier of a first tag associated with a first entity;
receiving from a second reader different from the first reader a second identifier of a second tag associated with a second entity;
determining that the first tag is in spatial or temporal proximity to the second tag;
when the first tag is in spatial or temporal proximity to the second tag, generating an association defining a correlation between the first identifier to the second identifier;
storing the association in a database;
receiving a post-association indication of a scan of the second tag;
and identifying a location of the first tag based on location information associated with the post-association indication.

9. The method of claim 8, the first entity being in a supply chain to supply one or both of goods and services to the second entity.

10. The method of claim 8, the first entity being a parcel delivery service for goods of the second entity.

11. The method of claim 8, the first identifier being an RFID identifier, and the second identifier being a barcode identifier.

12. The method of claim 8, the instructions that cause the computer to determine that the first tag is in spatial or temporal proximity to the second tag include additional instructions that, when executed by the computer, cause the computer to perform further operations comprising:
receiving an image of an asset having the first tag and the second tag attached thereto; and
determining that the first tag and the second tag are present in the image.

13. The method of claim 8, further comprising additional instructions that, when executed by the computer, cause the computer to perform operations comprising: receiving a post-association indication of a scan of the second tag, and using location information associated with the post-association indication to track the first tag.

14. A system for correlating identifiers of tags, comprising:
a tag reader;
a camera;
a conveyor belt to convey assets past the tag reader and the camera in order; and
an association module in wireless communication with the tag reader and the camera, the association module configured to:
receive a first identifier of a first tag;
receive a second identifier of a second tag;
determine that the first tag is in spatial or temporal proximity to the second tag;
when the first tag is in spatial or temporal proximity to the second tag, generate an association defining a correlation between the first identifier to the second identifier; and,
store the association in a database.

15. The system of claim 14, the first tag being associated with a first entity, the second tag being associated with a second entity.

16. The system of claim 14, the first tag being of a first type, the second tag being of a second type.

17. The system of claim 16, the first type being RFID scanned by the tag reader, the second type being a barcode scanned by the camera.

18. The system of claim 14, further comprising an asset management module configured to receive a post-association indication of a scan of the barcode, and to use location information associated with the post-association indication to track the first tag.

19. The system of claim 14, further comprising an asset management module comprising computer readable instructions that when executed by a processor operate to: receive a post-association indication of a scan of the second tag, and to use location information associated with the post-association indication to track the first tag.

* * * * *